UNITED STATES PATENT OFFICE.

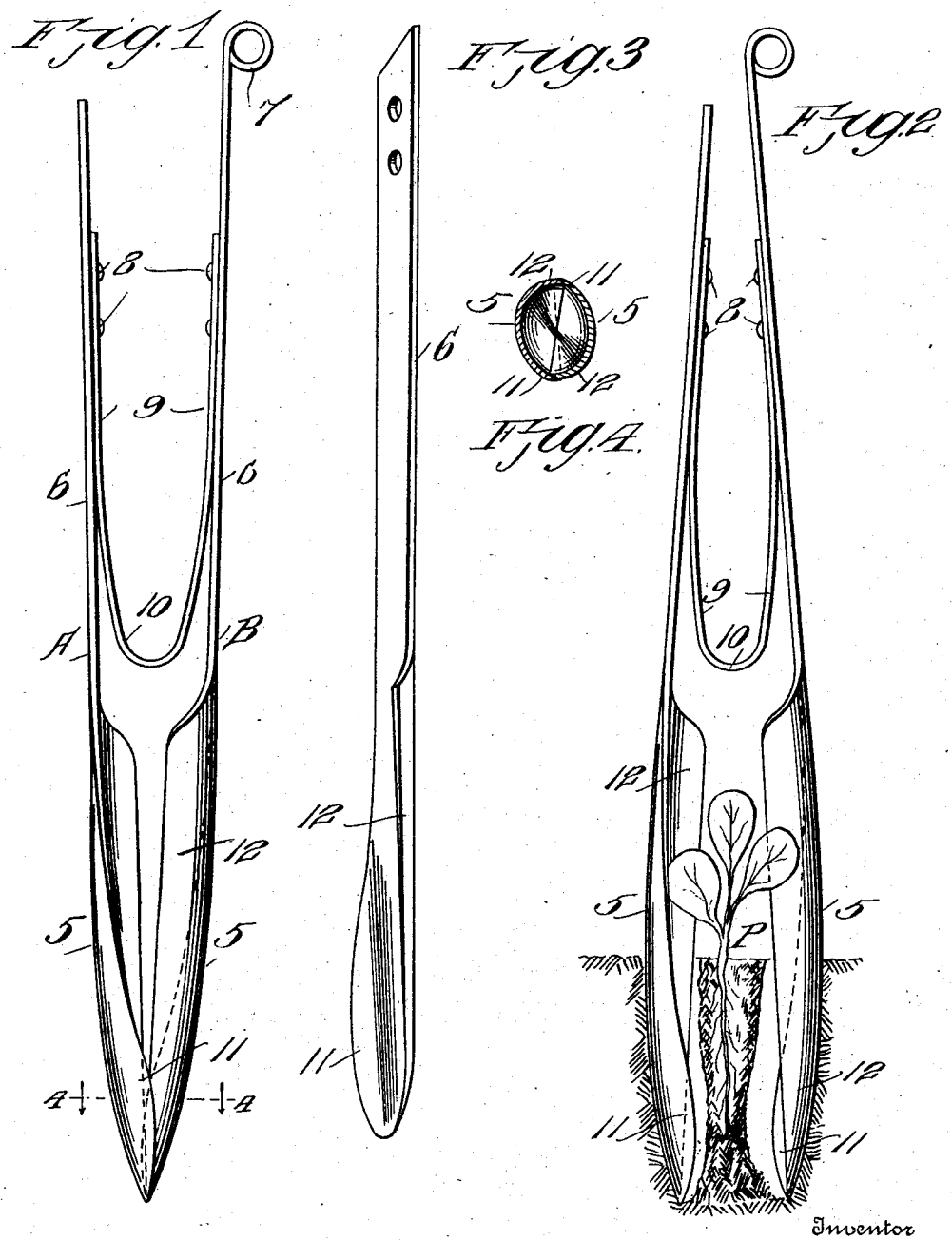

JOHN J. KLEEBERGER, OF SAN BENITO, TEXAS.

PLANT-SETTER.

974,077.  Specification of Letters Patent.  Patented Oct. 25, 1910.

Application filed May 7, 1910. Serial No. 559,928.

*To all whom it may concern:*

Be it known that I, JOHN J. KLEEBERGER, a native citizen of the United States, residing at San Benito, in the county of Cameron and State of Texas, have invented new and useful Improvements in Plant-Setters, of which the following is a specification.

This invention relates to devices for setting or transplanting plants, and it has for its object to provide a device of this class which shall possess superior advantages in point of simplicity, durability and general efficiency.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention; it being, however, understood that no limitation is necessarily made to the precise structural details therein exhibited, but that changes, alterations and modifications within the scope of the invention may be resorted to when desired.

In the drawing,—Figure 1 is a side elevation of an implement constructed in accordance with the invention. Fig. 2 is a similar view illustrating the operation of the same. Fig. 3 is a perspective view of one of the members of the improved implement. Fig. 4 is a sectional detail view taken on the plane indicated by the line 4—4 in Fig. 1.

Corresponding parts in the several figures are denoted by like characters of reference.

The improved implement is composed of two side members A and B, each comprising a blade 5 and an upwardly extending arm 6, which in the case of the member B is further extended and bent to form an eye 7 through which a cross bar may be passed to form a convenient hand grip for the operator, although such cross bar may be dispensed with and has not been shown in the drawing. The arms or handles 6 of the members A and B are secured by fastening means, such as rivets 8, upon the limbs 9 of a V-shaped spring 10, which not only serves as a connecting medium for the side members A and B, but the tension of which is exerted to force the blades 5, 5 in the direction of each other, as clearly seen in Fig. 1 of the drawings.

Each of the blades 5 is formed at its lower end with a spoon-shaped extremity 11 having a spirally curved outer face, and each of said blades is provided at one edge with an inturned flange 12 which is slightly overlapped by the spoon-shaped extremity of the opposite blade, as will be clearly seen in Fig. 1 of the drawing, where the blades are shown as being held closely together by the action of the spring 10.

In the operation of this device the plant that is to be set or transplanted, and which has been indicated at P in Fig. 2, is dropped between the blades 5, 5, and the said blades being held closely together by the action of the spring 10 are now inserted into the ground with a spiral or twisting movement, the said blades entering the ground with an auger-like movement which forms a suitable aperture for the reception of the roots of the plant. Pressure is now exerted upon the upwardly extending arms 6, 6 of the members A, B, whereby said arms are forced in the direction of each other against the tension of the spring, thus separating the blades 5, 5 and enabling the tool to be withdrawn from the ground, while the plant is left in position. As the implement is withdrawn, the adjacent dirt will fall upon the roots of the plant which will thus be properly fixed in the ground.

As will be seen from the foregoing description, the improved implement is simple in construction, and it has been found thoroughly efficient for the purposes for which it is provided.

Having thus described the invention, what is claimed as new, is:—

A transplanting implement of the character described comprising two members, each consisting of a blade having an upwardly extending arm, said arms being secured upon the limbs of a V-shaped spring which is interposed therebetween, and said blades having each a spoon-shaped extremity and an upwardly extending flange at one edge, the flanged edge of each member being slightly overlapped by the spoon-shaped extremity of the opposite member when the parts are removed.

In testimony whereof I affix my signature in presence of two witnesses.

JOHN J. KLEEBERGER.

Witnesses:
J. R. COLLINS,
L. R. WELCH.